June 4, 1946.　　　　F. B. DOANE　　　　2,401,467
METHOD OF AND APPARATUS FOR MAGNETIC TESTING
Filed May 22, 1939　　　6 Sheets-Sheet 1

Inventor
Foster B. Doane.
by Charles H. Mills Attys.

June 4, 1946.    F. B. DOANE    2,401,467
METHOD OF AND APPARATUS FOR MAGNETIC TESTING
Filed May 22, 1939    6 Sheets-Sheet 6

Inventor
Foster B. Doane.
by Charles T. Hill Attys.

Patented June 4, 1946

2,401,467

UNITED STATES PATENT OFFICE 2,401,467

METHOD OF AND APPARATUS FOR MAGNETIC TESTING

Foster B. Doane, Wilmette, Ill., assignor to Magnaflux Corporation, Chicago, Ill., a corporation of Delaware Application May 22, 1939, Serial No. 274,877

4 Claims. (Cl. 175—183)

This invention relates to improvements in a method of and apparatus for magnetically testing magnetizable metallic objects to ascertain the location, nature and extent of faults in the metals, such as highly localized stresses, discontinuities, etc., although the invention may have other uses and purposes as will be apparent to one skilled in the art.

I am aware that in the past many and various types of equipment for magnetically inspecting or testing metallic articles have been developed as well as various methods of magnetic inspection. Some of these formerly known arrangements pass electrical current directly through the test piece to establish a circular magnetization within the piece, while others utilize a coil for longitudinally magnetizing the test piece. Certain arrangements were also provided for demagnetizing the test piece after it had been inspected.

However, it is desirable to provide a method of and apparatus for magnetic testing which is more flexible and which is capable of a greater flexibility in the testing of a metallic item, so that it is not necessary to move the item from one location to another, rearrange it, and adjust it to accommodate the various magnetizing forces and the demagnetizing operation. Further, in no instance of which I am aware has any apparatus or a method been provided for establishing a control of bi-polar or vector resultant magnetic fields within the test piece, and such is desirable in many instances, such, for example, as the very accurate testing of axles and similar items.

With the foregoing in mind, it is an important object of the present invention to provide a method of and apparatus for inducing both circular and longitudinal magnetization in a test piece, in successive order, without moving the test piece.

Another object of the invention is the provision of a method of and apparatus for inducing circular and longitudinal magnetization in a test piece, in successive order or simultaneously, and then demagnetizing the test piece, without moving the test piece during the entire operation.

A further object of this invention is to provide a method of and apparatus for inducing both circular and longitudinal magnetization in a part, successively or simultaneously, and controlling the vector field when both types of magnetization are simultaneously induced, and when desired demagnetizing the test piece, without moving the test piece during the entire operation.

It is also an object of this invention to provide a method of and apparatus for inducing a vector or bi-polar magnetization field of controlled intensity and direction in a test piece to be examined for abrupt changes in permeability.

Another feature of the invention is to provide a method of and apparatus for inducing a variable vector magnetization field of controlled intensity and direction in a test piece, wherein the vector field may be varied over a wide angular range as to direction as well as to intensity.

Still another object of the invention is the provision of a method of and apparatus for inducing an angular magnetic field of controlled intensity and direction in a test piece, so that the field will cross the direction of a possible fault or defect in the test piece at the maximum or optimum angle.

Another feature of the invention is the provision of a method of and apparatus for magnetically inspecting a test piece, by which a magnetic field may be set up in the test piece in a direction at a favorable angle to a fault in the test piece, substantially regardless of the shape of the test piece or the direction or location of the fault therein.

A further feature of the invention is the provision of apparatus for magnetically inspecting a test piece, which apparatus is simple in construction, economical to manufacture and use, and may be readily manipulated by an operator to establish a magnetizing field in substantially any desired direction within the test piece, vary the direction and intensity of various magnetic fields through the test piece at will, and ultimately demagnetize the test piece, without moving or altering the location of the test piece during the entire time it is associated with the apparatus.

Also an object of the invention is the provision of a method of and apparatus for producing a rotating magnetic field in a test piece.

Still a further object of the invention is the provision of a method of and apparatus for producing an oscillating magnetic field in a test piece.

Another object of the invention is to provide a method of and apparatus for producing an oscillating magnetic field in a test piece, which field may be controlled to oscillate between any of a plurality of predetermined pairs of angular boundaries.

Another important feature of the invention is the provision of apparatus capable of substantially universally magnetizing a test piece.

While some of the more salient features, characteristics and advantages of the present invention have been above pointed out, others will become apparent from the following disclosures, taken in conjunction with the accompanying drawings, in which:

Figure 3 is a fragmentary wiring diagram of electrical circuits embodied in the structure of Figures 1 and 2, with the usual meter connections eliminated;

As shown on the drawings:

It will be understood that the present invention may be made up in a number of styles and types, with a multitude of variations in arrangement, both as to actual mechanical parts and circuit connections. Of course, it would be impossible to set forth and describe herein even a small fraction of the possible variations of an invention of this character. However, as illustrative of the flexibility of the invention as to construction and circuit connections, I have disclosed two different embodiments, both of which will accomplish the same results.

It will also be appreciated that with each embodiment of the invention, alternating current or direct current may be used, alternating current being most frequently preferable in view of its greater availability and because it may be handled with greater facility in demagnetizing operations in comparison with the employment of apparatus to cause a rapid reversing of direct current for this purpose.

Figure 1:
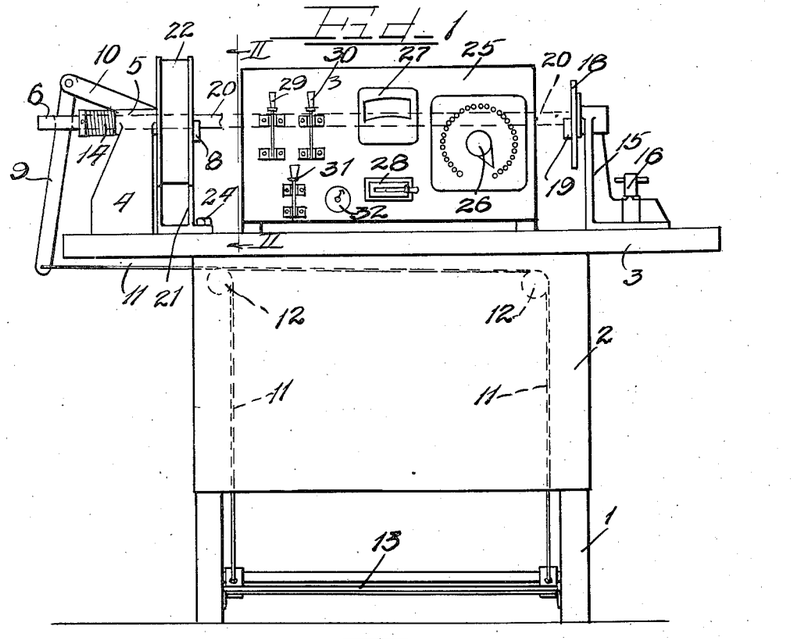
Figure 1 is a view in elevation, with some parts shown diagrammatically, of a magnetic testing device embodying principles of the present invention.
Figure 2:
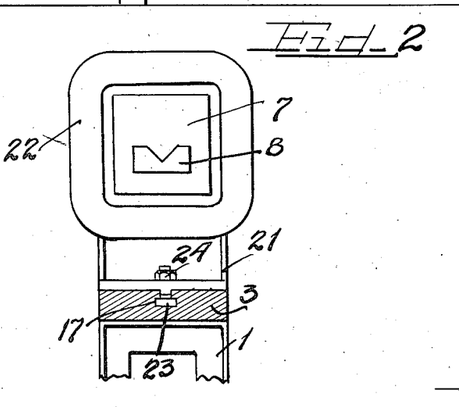
Figure 2 is a fragmentary vertical sectional view, with parts omitted, taken substantially as indicated by the line II—II of Figure 1, looking in the direction of the arrows.

With reference to Figures 1 and 2, it will be seen that one form of the invention may embody a frame 1, sheathed for protection to the operator, as indicated at 2, and upon which a bed plate 3 is disposed. Near one end of the bed 3 is a fixed head 4 having a portion 5 formed as a journal for a sliding or reciprocable rod 6. On the inner end thereof, the rod 6 carries an electrically conductive face plate 7 to which is secured a V-support 8 for one end of the test piece. The rod is reciprocated by means of a lever 9 extending through a slot near the outer end of the arm and having one end pivoted to a fixed arm 10. The other end of the lever is connected to a double cable 11—11 extending over a pair of spaced pulleys 12—12 inside the sheathing 2 and connected to a suitable foot pedal 13.

Applying pressure upon the foot pedal 13 causes the lever 9 to move the rod 6 and conductive plate 7 inwardly to insure tight contact with the test piece resting upon the V-support 8. Any suitable form of latching mechanism may be used in connection with the foot pedal to hold the rod 6 in the desired degree of inward adjustment. Upon release of the latching mechanism, if the same is utilized, a coil spring 14 suitably disposed between a collar carried by the rod and the head 4 urges the rod outwardly to initial position.

The bed 3 is also provided with a movable head 15 which may be anchored in any desired position along the bed by means of a threaded anchoring element 16. The movable head 15 is, of course, provided with a bolt head rider for an inverted T-groove 17 in the bed 3. This movable head also carries a conductive plate 18, upon which is another V-support 19 similar to the V-support 8 on the fixed head. Between the two supports 8 and 19, a test piece, indicated at 20 in Figure 1, may be disposed and held in proper position for magnetic inspection. It is simply necessary to adjust the movable head 15 to approximately the correct location, place the test piece in position, and step upon the foot pedal 13 to insure a tight contact between the contact plates 7 and 18 and the test piece.

Also slidable along the bed 3 is a frame 21 carrying a coil 22 of sufficient size to freely pass over the conductive plate 7, and likewise any test piece held between the conductive plates 7 and 18. This frame 21 carries a bolt head rider 23 disposed in the groove 17 in the bed and may be anchored in any desired position along the bed by means of a nut 24 or the equivalent. When the coil is used to magnetize the test piece, it may be slid along to various locations along the test piece, and when not in use, it is moved back to the position shown in Figure 1 adjacent the fixed head 4, leaving exposed beyond the coil the conductive plate 7 so that entire freedom is had for a full inspection of the test piece by virtue of the circular magnetization due to the passage of current from the conductive plate 7 to the conductive plate 18 directly through the test piece.

Also carried by the frame 1 behind the bed 3 is a switchboard or control panel 25. This panel carries a dial switch 26 for controlling current intensity both through the coil 22 and through the test piece between the face plates 7 and 18. Also mounted on the panel is a meter 27 with a meter switch 28, the connections for which are not shown in the wiring diagram of Figure 3, a pair of control switches 29 and 30, a main or starting switch 31, and a variable resistor control 32.

When the test piece is mounted as above described, energization may be established by hand through the main switch 31 or through a foot pedal switch 33, indicated in Figure 3 which is responsive to a pressure upon the pedal 13. After the main circuit is closed in either way, closure of the switch 29, with the switch 30 remaining open, effects circular magnetization of the test piece by passing current straight through the test piece from the face plate 7 to the face plate 18. Likewise, with the switch 29 open and switch 30 closed, longitudinal magnetization of the test piece is effected by way of the coil 22 which may be moved along the test piece as above described. Simultaneous closure of both switches 29 and 30 results in energization of both the coil 22 and the passage of current directly through the test piece between the face plates, thus setting up a bi-polar magnetic field in the test piece which is the resultant of the circular and longitudinal fields.

The intensity and direction of the bi-polar or vector field may then be controlled by means of the variable resistor 32, used singly or in conjunction with the dial switch 26, the dial switch, of course, exercising a direct control over the total strength of the field, and the variable resistor exercising a specific directional control over the bi-polar or vector field. When alternating current is used to establish at least one of the component magnetic fields, the induced vector or resultant magnetic field within the test piece may be made to swing or oscillate through at least a 90 degree angle with cycle reversals, and thus this resultant field may be made to cross the direction of a possible defect at the optimum or at least a very favorable angle.

To illustrate the universality of this invention, several results may be mentioned by way of example and not by way of limitation. If both magnetizing forces are direct current, the direction of the resultant field may be controlled with a nice accuracy. Likewise, if both forces are alternating current and in phase, the direction of the resultant field may be controlled. If one magnetizing force is direct current and one is alternating current, an oscillating resultant field is produced, and this field may be made to oscillate through different selected regions of a 360° arc by changing the direction of the direct current, interchanging the direct current magnetizing force for the alternating current, etc. In addition, it may be mentioned that a rotating resultant field is produced with alternating current magnetizing forces out of phase. In some instances, the strength of the resultant oscillating or rotating fields may cyclically vary, while remaining constant in other instances, depending, of course, upon relative intensities of the magnetizing currents and phase angles. The general strength of the resultant fields may be controlled through a suitable range by controlling the intensities of the magnetizing currents. Hereinafter, certain of these examples will be more fully described in connection with Figures 8 to 13, inclusive, of the drawings.

It will therefore be seen that a test piece may be set up on the apparatus only once. After setting it up, it may first be magnetized circularly or longitudinally, tested by the application of finely divided particles of paramagnetic material, magnetized the other way, tested, and then magnetized by the simultaneous application of both fields to give a vector or resultant field, and this vector field varied through a considerable angular range, so that it will be practically impossible to fail to find a possible defect in the test piece. Still without changing the position of the test piece, it may be demagnetized at any desired time during the testing with equal facility.

For example, the test piece may be demagnetized by passing current directly through it from one face plate to another, using alternating current, and rotating the dial switch slowly and uniformly in a clockwise direction from maximum to minimum. The test piece may also be demagnetized by setting the dial switch at substantially the same location used for magnetizing or at the next higher notch, establishing continuous alternating current flow through the coil, and passing the coil along the length of the test piece, and again withdrawing it to initial position adjacent the fixed head, as seen in Figure 1. Either method will demagnetize the test piece whether its magnetization is circular, longitudinal, or a resultant of both.

It will therefore be seen that a very thorough and complete, and, in fact, a substantially universal magnetic inspection of a test piece may be made with the above described apparatus with only one mounting of the test piece.

In Figure 3, I have illustrated the wiring diagram of the electrical circuit utilized in the apparatus of Figures 1 and 2. It will be seen that conductors 34 and 35 may be connected to any suitable source of electrical energy. These conductors are also connected to a switch or circuit breaker, generally indicated by numeral 36, of the type which opens the circuit at a point of substantially zero current value on the cycle by means of the disruption of an arc or otherwise, such, for example, as a de-ion breaker. The coil 37 of this breaker is energized by means of either the foot pedal switch 33 or the hand-operated switch 31 through conductors 38 and 39.

One side of the breaker is connected through a conductor 40 to the contact ring 41 of the dial switch 26. The other side of the breaker is connected through a conductor 42 to one end of the coil of an auto transformer 43, the other end of the coil being connected to the conductor 40 by way of a wire 44. The dial switch embodies a number of contact points 45 which may be successively contacted by the rotating arm of the switch, and each contact point or button is connected by a separate lead to a different point on the auto transformer coil, as indicated at 46. Of course, the contact buttons 45 are successively connected to points on the auto transformer coil so that, as shown in this figure, the lower left-hand button provides maximum current while the lower right-hand button provides minimum current.

Magnetizing current is supplied by way of a transformer 47 embodying a pair of primary coils 48 and 49 connected in parallel in the aforesaid conductor 40. One end of the secondary coil 50 of this transformer is connected through a conductor 51 to the face plate 7 on the fixed head 4 of the machine. The switch 29 is arranged to interrupt flow of current through the conductor 51. The other end of the secondary coil 50 is connected through a conductor 52 to a ground 53. The other face plate 18 on the movable head of the machine is connected through a conductor 54 to a ground at 55. The ultimate ground is preferably the frame of the machine, and in most instances it is advantageous to use a pigtail cable 56 from the movable head or tail stock 15 of the machine to the frame 1. It will be seen that the magnetizing coil 22 is connected by way of conductors 57 and 58 in parallel with the face plates 7 and 18, and consequently in parallel with the test piece. The variable resistor 32 is in series with the magnetizing coil 22 directly across the secondary 50 of the transformer 47, and the switch 30 is positioned to interrupt current flow through the coil 22.

From the foregoing description of the wiring diagram, it will be seen that when either switch 31 or 33 is closed, the circuit breaker will be closed and current will flow through the conductor 40, the contact ring 41 of the dial switch, whatever contact button 45 the dial switch touches, through the coil of the auto transformer and back to the opposite side of the line. Likewise, current will flow through the paralleled primary coils 48 and 49 of the transformer 47, and the magnitude of this current will be determined by the setting of the dial switch 26. In the event the switch 29 is closed and the switch 30 opened, the induced current in the secondary 50 of the transformer will flow directly through the test piece indicated at 20 from the face plate 7 to the face plate 18, circularly magnetizing the test piece. In the event the switch 29 is opened and the switch 30 is closed, the secondary current will flow through the magnetising coil 22 which may be moved along the test piece to longitudinally magnetize it. In the event both switches 29 and 30 are closed, the secondary current will flow through both the test piece and the magnetizing coil 22, thereby setting up a vector or resultant magnetic field in the test piece. As stated above, the strength or intensity of this field may be in general controlled by the dial switch 26, while the intensity to a lesser extent and the direction of this vector field may be controlled by the variable resistor 32. It will also be seen that in demagnetizing the test piece, the switch 29 being closed and the switch 30 opened, it is a simple expedient when alternating current is used to slowly and uniformly move the dial switch arm from its lower left-hand position to its lower right-hand position, thereby gradually reducing the alternating current through the test piece to zero.

Figure 4:
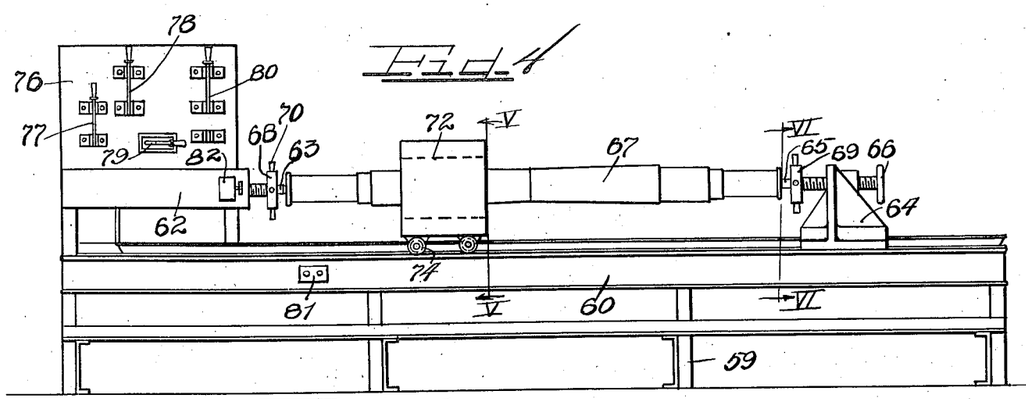
Figure 4 is an elevational view of a magnetic testing device of somewhat different construction, intended for the same purpose as the device of Figures 1 and 2 and also embodying principles of the present invention.
Figure 5:
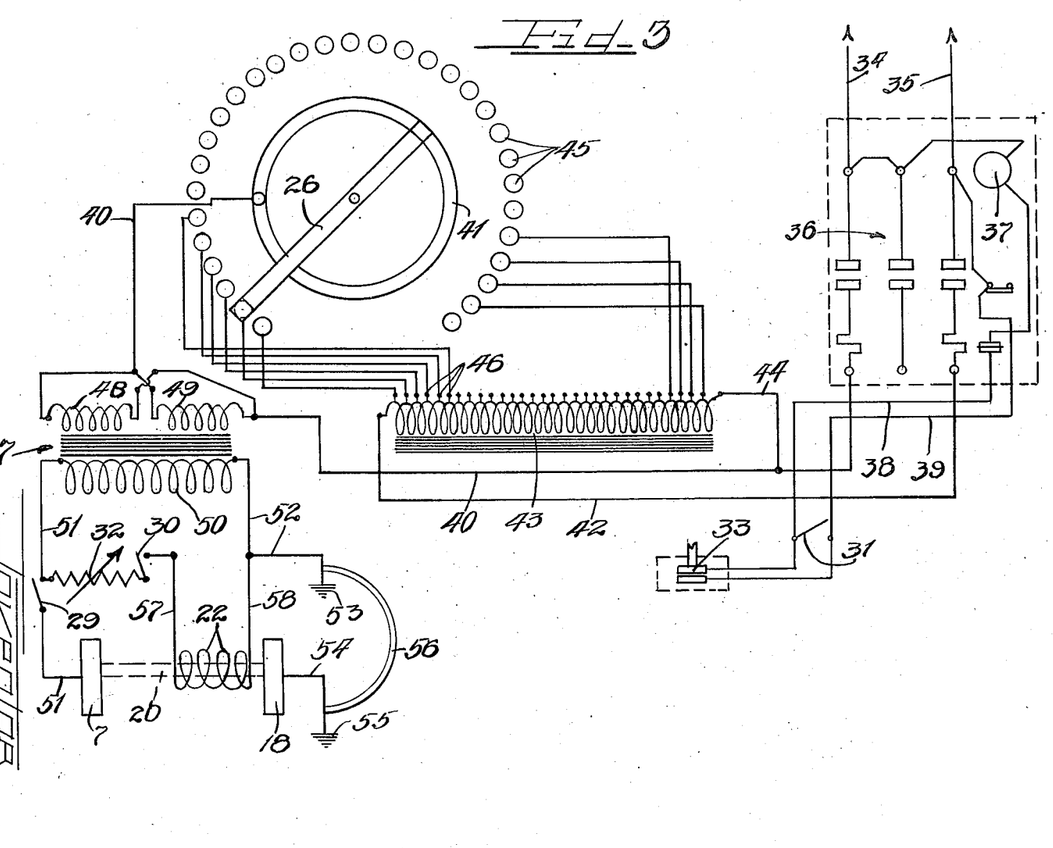
Figure 5 is an enlarged fragmentary vertical sectional view taken substantially as indicated by the line V—V of Figure 4, with the test piece eliminated.
Figure 6:
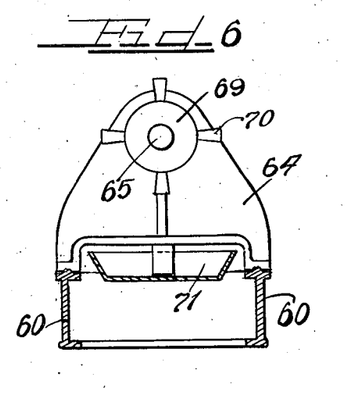
Figure 6 is a fragmentary vertical sectional view taken substantially as indicated by the line VI—VI of Figure 4.

In that form of the apparatus seen in Figures 4, 5 and 6, there is a suitable frame 59 supporting a bed in the nature of a track and made up of channel frame members 60—60, each of which is given a rail-like formation 61 on its upper face. Near one end thereof, the track bed supports a fixed head stock 62 equipped with a centering screw 63, adjustable in any suitable manner. A movable head or tail stock 64 is slidable on the track bed and may be anchored in any desired position therealong by the usual form of anchoring means. This tail stock carries a centering screw 65 operated by a suitable handwheel 66 for supporting engagement with the test piece.

This apparatus is, for purposes of illustration, shown heavier and capable of supporting a larger test piece than the apparatus illustrated in Figures 1 and 2. In this instance, the apparatus seen in Figures 4, 5 and 6 is shown supporting a car axle 67 as a test piece. The axle is mounted between the centering screws 63 and 65 on the head and tail stocks respectively. The head stock is provided with a contact plate 68, and the tail stock is provided with a similar contact plate 69. Handles 70 are provided on each contact plate for adjusting it, and after the test piece has been mounted in position upon the centering screws, the contact plates 68 and 69 are turned into tight engagement with the ends of the test piece. Each contact plate operates on a fine pitch screw independently of the movement of the center screws 63 and 65. It will be seen that a tight electrical contact may thereupon be easily established with each end of the test piece.

As viewed in Figure 4, the contact plates 68 and 69 are not in engagement with the test piece, and the next operation prior to testing would be the turning of these contact plates into tight engagement with the respective ends of the test piece. The test piece may be magnetically inspected with the use of finely divided paramagnetic particles, and these particles may be suspended in a suitable liquid vehicle if so desired. To this end, a tank 71 is provided between the rails 60—60 forming the track bed for recapturing the paramagnetic particles.

When the contact plates 68 and 69 are in engagement with the test piece 67 and the circuit is closed, current passes directly through the test piece from one contact plate to the other and circularly magnetizes the test piece. To provide longitudinal magnetization of the test piece, a traveling coil 72 is utilized carried on a frame 73 equipped with a set of wheels 74 which travel on the rail-like formation 61—61 on the track bed. This coil may be easily moved along the test piece to any desirable location along the track bed, the coil having an aperture 75 therethrough sufficiently large to freely pass over the test piece, the respective face plates and their handles 70, and over the fixed head 62, so that the coil will be entirely out of the way while the test piece is being mounted or removed, or when the coil is not in use. Obviously, when the coil is energized, it will provide longitudinal magnetization of the test piece.

The frame also supports a suitable control panel 76 carrying the operating switches for the electrical circuit associated with the structure above described. It will be understood that this control panel may carry any suitable form of meter together with meter switches in a known manner, it not being deemed necessary herein to illustrate the meters and meter switches, nor the wiring circuits for such meters. Mounted upon the control panel are several switches, including single throw switches 77 and 78, a double-pole, double-throw switch 79, and a single-pole, double-throw switch 80. The switch 77 directly controls the circuit through the test piece from the contact plate 68 to the contact plate 69. The switch 78 controls the circuit through the coil 72. The double-throw, double-pole switch 79 exercises a two-way control over the voltage and amperage from the power transformer, this switch being incorporated in the primary of the transformer to connect the coils therein in series or parallel, as will more fully later appear. The single-pole, double-throw switch 80 is a selector switch also exercising a control over the voltage and amperage, and this switch is incorporated in the secondary of the power transformer.

In addition to the aforesaid control switches, a main start and stop switch 81 is located in a convenient position on the track bed 60. A limit switch 82 is provided on the fixed head 62, this limit switch being automatically actuated to open the circuit through the coil 72 when the coil is moved completely off the test piece. It will be seen therefore that the test piece cannot be removed before the coil clears it and the circuit through the coil is opened. As will more fully later appear, when the coil is in position to cause actuation of the limit switch 82, the starting button of the start and stop switch 81 becomes a "hold-down" button, and the circuit through either the coil or the contact plates 68 and 69 will remain closed only as long as the start button is held down.

Figure 7:
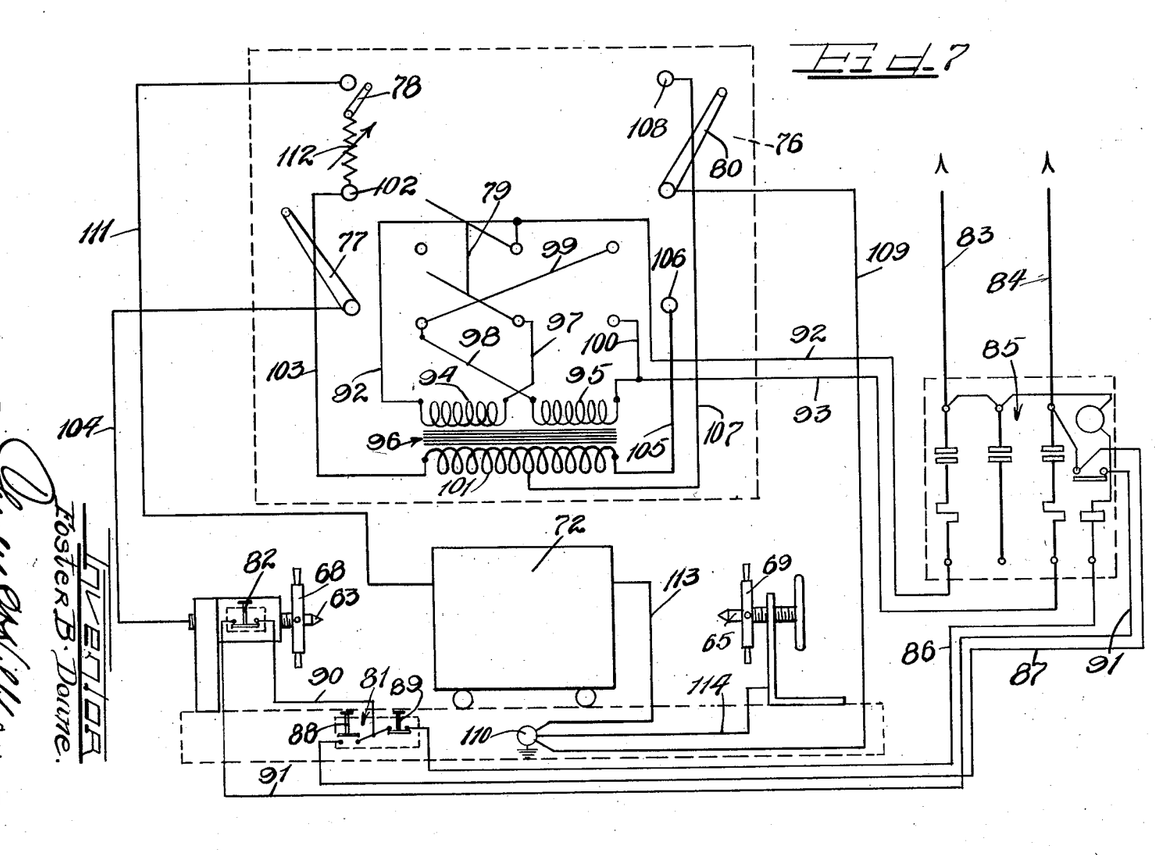
Figure 7 is a fragmentary wiring diagram of the electrical circuits embodied in the apparatus of Figures 4, 5 and 6, with the customary meter connections eliminated.

With reference to Figure 7, it will be seen that the electrical circuits embodied in the apparatus shown in Figures 4, 5 and 6 include a pair of conductors 83 and 84 which may be connected to any suitable source of electrical energy. These conductors are in turn connected to a circuit breaker, preferably of the de-ion type, generally indicated by numeral 85. The control portion of the circuit breaker is connected through conductors 86 and 87 to opposite sides of the start and stop switch 81. This switch is of the usual start and stop type and embodies a starting push button 88 and a stop button 89. The limit switch 82 is connected at one terminal through a conductor 90 to the mid-point between the start button 88 and the stop button 89. The other terminal of the limit switch is connected through a conductor 91 to the control part of the circuit breaker. It will be seen, therefore, that when the limit switch 82 is opened, it will be necessary to hold down the start button 88 as long as it is desired to keep the circuit closed. On the other hand, if the limit switch 82 is in closed position, it is not necessary to hold the start button 88 in closed position to maintain a closed circuit.

The magnetizing energy is supplied through a pair of conductors 92 and 93 from the circuit breaker to the primary coils 94 and 95 of a power transformer 96. The conductor 93 is connected to one end of the coil 95; the conductor 92 is connected to one end of the coil 94. The opposite end of the coil 94 is connected to the central terminal of the double-pole, double-throw switch 79, as indicated at 97. The other end of the coil 95 is connected to an outer terminal of this switch by a conductor 98, this terminal being connected by a conductor 99 to the terminal on the opposite side of the switch. A conductor 100 connects the other outside terminal of the switch back to the conductor 93. Thus, it will be seen that when the switch 79 is thrown to the left, as viewed in Figure 7, the primary coils 94 and 95 will be connected in series, while when the switch 79 is thrown to the right, the primary coils will be connected in parallel. Accordingly, if a lower voltage and amperage is desired in the magnetizing circuits, the primary coils may be connected in series, and if a higher voltage and amperage is desired, they may be connected in parallel.

The secondary 101 of the power transformer is connected at one end to a terminal 102 by a conductor 103. This terminal is selectively engageable by the aforesaid switch 77 which is connected through a conductor 104 to the contact plate 68 on the head stock of the machine. The other end of the secondary coil 101 is connected through a conductor 105 to a terminal 106 of the single-pole, double-throw switch 80. This secondary coil is also provided with a tap connected by way of the conductor 107 to the other terminal 108 of the switch 80. Through a conductor 109, the switch is also connected to the ground at 110. It will therefore be seen that when the switch 80 is thrown in downward position in connection with the terminal 106, full power from the secondary coil 101 is provided, while when the switch is thrown upwardly into contact with the terminal 108, less power from the secondary is provided.

The magnetizing coil 72 is connected through a conductor 111 in series with a variable resistor 112, the aforesaid switch 78 controlling the energization of the circuit through the coil. It will be noted, also, that the coil and the resistor are in parallel with the circuit through the test piece from the contact plate 68 to the contact plate 69, the coil being grounded through a conductor 113 and the face plate 69 being grounded through a conductor 114.

From the foregoing description of the wiring plan, it will be seen that with this illustrated arrangement four different power values may be obtained in the magnetizing circuit. The lowest value will be with the switch 80 in contact with the terminal 108 and with the primary coils 94 and 95 connected in series through the switch 79. The next higher value will be to connect the primary coils 94 and 95 in parallel by throwing the switch 79 in the opposite direction. The third value will be to have the primary coils 94 and 95 connected in series with the switch 80 in contact with the terminal 106, and the last or highest value will be the connection of the primary coils in parallel with the switch 80 in contact with the terminal 106.

Assuming that the power circuit has been energized through the start and stop switch 81, it will be seen that the closing of the switch 77 produces a current directly through the test piece for circular magnetization. Opening the switch 77 and closing the switch 78 energizes the coil 72 for longitudinal magnetization of the test piece. Simultaneous closing of both switches 77 and 78 passes current directly through the test piece and also energizes the coil 72, thus giving a vector or resultant magnetization field. This field, as previously explained, may be varied through a wide angular range as to its direction by the variable resistor 112. The intensity of the field may be controlled, of course, by the switches 79 and 80.

When it is desired to demagnetize a part, this may be accomplished in the manner previously explained, utilizing a simple device for reducing current to a minimum. Demagnetizing a part from longitudinal, circular, or resultant magnetization may be accomplished by moving the coil on and off the part. Substantially all ranges and characters of tests may be made with the structure and circuits of Figures 4 to 7, inclusive, as explained above in connection with Figures 1 to 3, inclusive.

In Figures 8 to 13, inclusive, various curves and vector diagrams are illustrated to depict in general the strength and direction of the resultant magnetic fields during various cycle increments of the respective magnetizing forces, these diagrams being by way of example only, to better illustrate the universality of the invention. The curves are arrived at by plotting the magnetizing forces against cycle intervals, and the vector diagrams indicate the direction of the resultant magnetic fields and, roughly, the strength of the fields at various increments of the current cycles.

Figures 8, 8A, 8B, 8C:
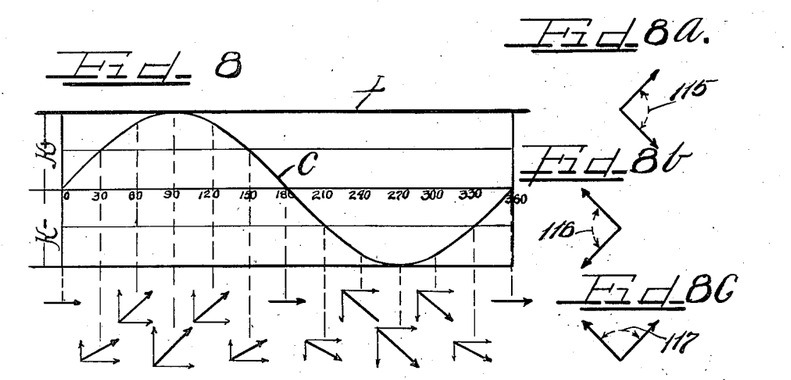
Figure 8 is a diagram showing magnetizing current curves with vector diagrams indicating variations in strength and intensity of the resultant magnetic fields.
Figure 8a indicates the angle of oscillation of the resultant magnetic field of Figure 8 when direct current is used to longitudinally magnetize the test piece and alternating current is used to circularly magnetize the test piece.
Figure 8b indicates the angle of oscillation of the resultant magnetic field with the direct current reversed in direction.
Figure 8c indicates the angle of oscillation of the resultant magnetic field when alternating current is used to longitudinally magnetize the test piece and direct current is used to circularly magnetize the test piece.

In Figure 8, direct current is used to produce longitudinal magnetization of the test piece, this current being indicated on the curve by the line L. Alternating current is used to magnetize the test piece circularly, in this instance the alternating current being sinusoidal and having a peak value equal to the direct current, as indicated by the line C. The vector diagrams beneath the graph indicate the direction and relative strength of the resultant magnetic field at each 30 degree interval in the cycle of the alternating current. Of course, at the instants when the alternating current is of zero value, the resultant magnetic field will be determined by the direct current only and thus appear longitudinally of the test piece, as indicated by the vector arrows opposite zero, 180 and 360 on the chart.

It will be noted that between these values, the resultant magnetic field will oscillate in direction and vary in strength in accordance with the wave of the alternating current. Thus, it will be seen that the resultant magnetic field reaches its upper or positive maximum at 90 degrees, and a lower or negative maximum at 270 degrees. In this particular instance, the resultant magnetic field oscillates in direction through the 90 degree angle 115 shown in Figure 8a, one boundary of the angle being 45 degrees in the first quadrant, and the other boundary of the angle being at 315 degrees in the fourth quadrant.

Figure 8D:
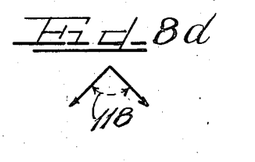
Figure 8d indicates the angle of oscillation of the magnetic field with the direct current reversed in direction.

The oscillating resultant field may be changed in location. For example, by reversing the direction of the direct current effecting longitudinal magnetization of the test piece, the angle of oscillation will be the 90 degree angle 116 shown in Figure 8b in the second and third quadrants exactly opposite to the showing in Figure 8a. Likewise, if direct current is used as the circular magnetizing force and alternating current as the longitudinal magnetizing force, the angle of oscillation of the resultant field will appear in the first and second quadrants indicated at 117 in Figure 8c. Again, if the direction of the direct current is reversed, the angle of oscillation will appear in the third and fourth quadrants, as indicated at 118 in Figure 8d.

It is apparent therefore that using one magnetizing force of direct current and another magnetizing force of alternating current will give an oscillating resultant magnetic field, and the general direction or region of oscillation of this resultant field may be predetermined and preselected by the simple expedient of selecting the direction of the direct current and choosing between the two currents for the component magnetizing forces.

Figure 9:
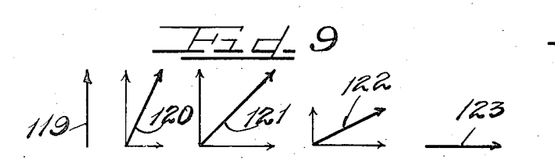
Figure 9 is a series of vector diagrams indicating the directions of the resultant magnetic field at various relations of circular to longitudinal magnetizing forces.

In Figure 9, I have illustrated the directions of the magnetic fields at various relations of the circular to the longitudinal magnetizing forces. The vectors shown in this figure are correct when direct current is used for both horizontal and circular magnetization or when alternating current is used for both with the phase angle equal to zero. The vector 119 is illustrative of the condition resulting when the circular magnetizing force is of some definite value, say, unit value, for example, and the longitudinal magnetizing force is zero. The next vector 120 is indicative of the condition resulting when the circular magnetizing force is twice that of the longitudinal magnetizing force. Vector 121 results when both magnetizing forces are equal. Vector 122 results when the longitudinal magnetizing force is twice the value of the circular magnetizing force, and vector 123 indicates, of course, the resultant field when the circular magnetizing force is zero and the longitudinal magnetizing force has unit value.

Of course, if alternating current is used for both longitudinal and circular magnetization, and the phase angle is of a definite value other than zero, there will be a change in the direction of the resultant magnetic field. From the showing in Figure 9 and the above description, it will be apparent that when both magnetizing forces are direct current, or both are alternating current, the direction of the resultant magnetic field across the test piece may be fixed to a fine degree of nicety by adjusting the intensity of one of the magnetizing forces relatively to the other. Thus, it is apparent that the resultant magnetic field may be made to cross the test piece at any desired angle within the test piece, in the event it is desired to investigate a suspected fault not clearly brought out by other resultant fields or if the shape of the test piece is such as to make it desirable to have a resultant field at a certain definite angle.

Figure 10:
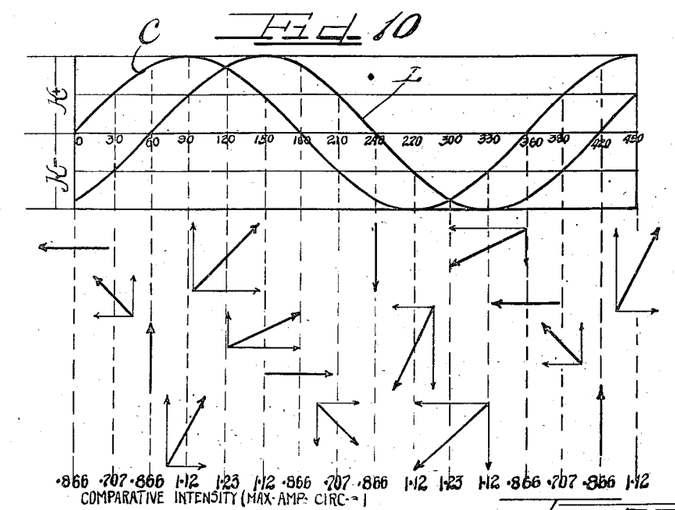
Figure 10 is a diagram showing magnetizing current curves and vector diagrams indicating variations in the relative direction and intensity of the resultant magnetic fields, with alternating current used for both longitudinal and circular magnetization, and with the two magnetizing currents 60 degrees out of phase.

Figure 10 indicates the relative strength and direction of the resultant magnetic field with equal alternating current circular and longitudinal magnetizing forces, the longitudinal force, represented by the curve L, lagging the circular magnetizing force, represented by the curve C, by 60 degrees. In this instance, it will be noted that a completely revolving magnetic field is produced, as indicated by the vector diagram. The strength of this field, however, varies, indicated by the relative lengths of the vector arrows. Due to the phase angle of 60 degrees between the magnetizing forces, the resultant field changes direction at right angles during the first 60 degrees of the cycle, and then changes direction again at right angles during the ensuing 120 degrees, so that 180 degrees are required for a complete reversal of direction. The next 60 degrees, namely, at 240 degrees of the cycle, cause another right-angle change of direction, and at 360 degrees the resultant field is the same as at the start of the cycle.

From the figures at the bottom of Figure 10, it will be seen that the comparative intensity of the resultant magnetic fields varies from 0.707 as a minimum to 1.23 as a maximum, assuming that the maximum amperage of the magnetizing forces is 1. At any phase angle other than zero or 180 degrees, the rotating magnetic field will rotate at a speed determined by the frequency of the applied alternating current.

It will be apparent that with a rotating magnetic field of the character indicated in Figure 10, the test piece may be substantially universally magnetically inspected. The test piece may be first inspected with either longitudinal magnetization or circular magnetization, then with the other, and after that with the rotating field, so that the lines of force in the magnetizing field must cross the test piece some time at substantially every possible angle.

Figure 11:
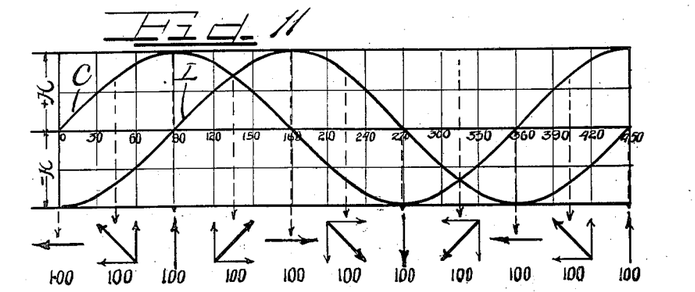
Figure 11 is a diagram similar to Figure 10, with the alternating current magnetizing forces 90 degrees out of phase.

In Figure 11, I have illustrated equal circular and longitudinal alternating current magnetizing forces, 90 degrees out of phase. The curve for the circular force is designated C, and that for the longitudinal force is designated L, as above. In this instance, it will be noted that the resultant magnetic field rotates through all four quadrants, but that it maintains a uniform strength at all times provided the R. M. S. or peak amplitude of the two magnetizing forces are equal. This resultant magnetic field is equal in magnitude or strength to that caused by the peak value of either of the alternating current forces taken alone.

Figure 12:
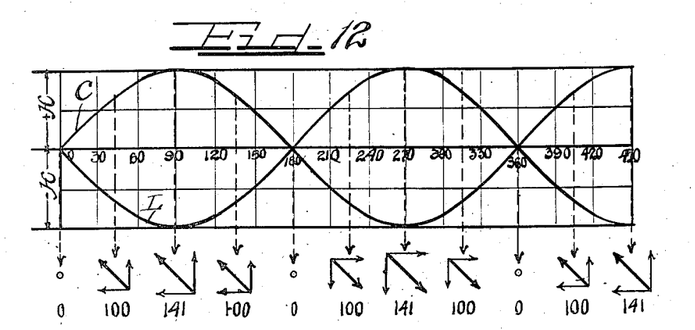
Figure 12 is a diagram similar to Figure 10, with the alternating current magnetizing forces 180 degrees out of phase.
Figure 13:
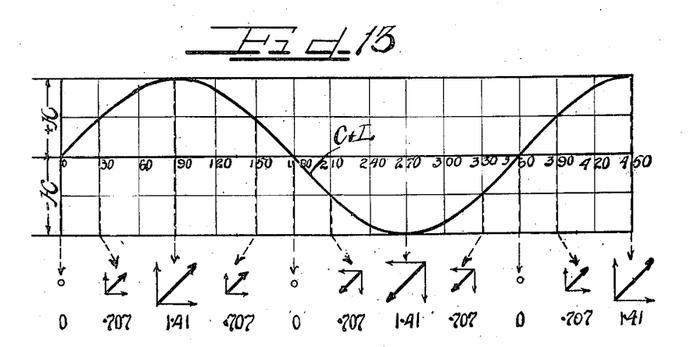
Figure 13 is a diagram similar to Figure 10, with the two alternating current magnetizing forces both in phase and of equal intensity.

In Figure 12, equal alternating current forces are illustrated, 180 degrees out of phase. In this instance, the resultant field maintains a fixed direction, but the strength of this resultant field varies sinusoidally with time, as indicated by the numerals at the bottom of Figure 12. The actual direction of the magnetic field can be controlled by adjusting the relative amplitudes of the two magnetizing forces. The resultant magnetic field will, of course, maintain a fixed direction with equal alternating current magnetizing forces in phase with each other, with the exception that this direction will be at right angles to that of the resultant field shown in Figure 12. The magnetizing forces in phase are illustrated in Figure 13, and the strength of the resultant field varies sinusoidally with time, as it did with the arrangement shown in Figure 12.

In connection with the diagrammatic showings illustrating the relative strengths and directions of the resultant magnetic fields, magnetizing forces of equal magnitude were selected only for the purpose of convenience. It will at once be apparent that, in certain instances, for example the showing in Figure 8, the size of the angle of oscillation may be changed by adjusting the relative values of the magnetizing forces. Likewise, the resultant magnetic force may be changed both as to strength and direction by varying the relative intensities of the magnetizing forces, varying the phase angle therebetween, utilizing direct current in one magnetizing force and alternating current in the other, etc., and an infinite variety of actual results in the characteristics of the resultant magnetic fields may be obtained. It should be definitely noted, however, that with the present invention the resultant magnetic fields may be fixed in direction, adjusted as to strength, caused to oscillate, or caused to rotate at the selection of the operator.

From the foregoing, it is apparent that I have provided a novel method of and apparatus for thoroughly and completely magnetically inspecting a test piece, the operator being able to successively magnetize the piece with fields in three different directions through the piece, namely, circular magnetization, longitudinal magnetization, and vector or resultant magnetization, the latter being controllable as to direction, and all three fields being controllable as to intensity. The operator may also provide an oscillating field in the test piece and control the angle of oscillation, or a rotating field of uniform or variable strength. Consequently, without the necessity of once moving the test piece after it has been set up, thorough inspection may be had with a magnetic field disposed across the direction of a possible defect at the optimum or most favorable angle, regardless of the location and character of the defect. It will also be noted that the method is simple and economical to practice, and the apparatus is economical, durable and efficient in construction and operation.

It will, of course, be understood that numerous details of construction may be varied through a wide range without departing from the principles of this invention, and it is, therefore, not the purpose to limit the patent granted hereon otherwise than is necessitated by the scope of the appended claims.

I claim as my invention:

1. In the art of magnetically inspecting a test piece for cracks and other imperfections, the method which comprises the steps of subjecting the test piece to a resultant magnetic field, swinging said field through an angular range to vary its direction and cause the field to cross any crack or other imperfection in the test piece at the optimum angle, and bringing finely divided particles of paramagnetic material sufficiently close to the object to adhere adjacent any such crack or other imperfection as a result of the increased reluctance thereat to magnetic flux.

2. The method of magnetically testing an object for cracks or other imperfections which comprises the steps of subjecting the object to a rotating magnetic field and bringing finely divided paramagnetic particles sufficiently close to the object to adhere adjacent any cracks or other imperfections providing thereat increased reluctance to magnetic flux.

3. In an arrangement for testing magnetizable workpieces for cracks by magnetizing the workpiece and depositing paramagnetic particles thereon, means for establishing a circular magnetic field about an arbitrary longitudinal axis, means for establishing a magnetic field substantially parallel to said arbitrary longitudinal axis, a direct current source for energizing one of said means, an alternating current source for simultaneously energizing the other of said means to produce in said workpiece a resulting magnetic field varying its direction by an angle of at least 90° to cause said paramagnetic particles to simultaneously indicate cracks in any direction, said alternating current source having a frequency sufficiently high to retain said particles on said workpiece over cracks therein.

4. In an arrangement for testing magnetizable workpieces for cracks by magnetizing the workpiece and depositing paramagnetic particles thereon, means for establishing a circular magnetic field about an arbitrary longitudinal axis, means for establishing a magnetic field parallel to said arbitrary longitudinal axis, two current sources for energizing said means respectively, said two current sources having different time characteristics so as to produce a resultant magnetization continuously changing its direction by an angle of at least 90°, at least one of said sources varying its current intensity with a frequency sufficiently high to retain said particles on said workpiece over cracks therein, whereby the particles adhering to the workpiece simultaneously indicate cracks in any direction.

FOSTER B. DOANE.